United States Patent [19]

Cornman

[11] Patent Number: 5,257,021
[45] Date of Patent: Oct. 26, 1993

[54] LOW-LEVEL WIND-SHEAR ALERT SYSTEM

[75] Inventor: Lawrence B. Cornman, Boulder, Colo.

[73] Assignee: University Corporation for Atmospheric Research, Boulder, Colo.

[21] Appl. No.: 718,345

[22] Filed: Jun. 19, 1991

[51] Int. Cl.$^5$ .............................................. G08B 23/00
[52] U.S. Cl. .................................. 340/968; 340/949; 342/26; 364/434
[58] Field of Search ........................ 340/963,968, 949; 73/178 T, 189; 364/427, 428, 434; 342/26, 33

[56] References Cited

U.S. PATENT DOCUMENTS

| | | | |
|---|---|---|---|
| 3,573,824 | 4/1971 | Armstrong et al. | 342/26 |
| 4,521,857 | 6/1985 | Reynolds, III | 342/26 |
| 4,649,388 | 3/1987 | Atlas | 342/26 |
| 4,712,108 | 12/1987 | Schwab | 73/189 |
| 4,965,573 | 10/1990 | Gallagher et al. | 340/968 |

OTHER PUBLICATIONS

The Federal Triangle, Washington Post, Oct. 17, 1983 "FAA Plans to Buy Wind-Shear Alert Devices".

Primary Examiner—Brent Swarthout
Attorney, Agent, or Firm—Duft, Graziano & Forest

[57] ABSTRACT

The apparatus of the present invention improved low-level wind shear alert system that provides an improved method of identifying the presence and locus of wind shear in a predefined area. This system enhances the operational effectiveness of the existing LLWAS system by mapping the two-dimensional wind velocity, measured at a number of locations, to a geographical indication of wind shear events. This system can also integrate data and processed information received from a plurality of sources, such as anemometers and Doppler radar systems, to produce low-level wind shear alerts of significantly improved accuracy over those of prior systems. In particular, the apparatus of the present invention makes use of the data and processed information produced by the existing Low-Level Wind Shear Alert System as well as that produced by the Terminal Doppler Weather Radar to precisely identify the locus and magnitude of low-level wind shear events within a predetermined area. This resultant geographical indication is displayed in color-graphic form to the air traffic control personnel and can also be transmitted via a telemetry link to aircraft in the vicinity of the airport for display therein.

13 Claims, 8 Drawing Sheets

LOW-LEVEL WIND-SHEAR ALERT SYSTEM

GOVERNMENT FUNDED INVENTION

This invention was made with Government support under Agreement No. ATM-8709659 awarded by the National Science Foundation. The Government has certain rights in this invention.

FIELD OF THE INVENTION

This invention relates to weather monitoring equipment and in particular to an improved low-level wind shear alert monitoring system for use in an airport environment.

PROBLEM

It is a problem in the field of weather monitoring systems to accurately determine the locus and magnitude of adverse weather conditions, especially those affecting airport operation. Of particular interest to airline operations is low altitude wind shear events which have been responsible for a number of disastrous air-carrier accidents. Wind shear is a change in wind speed and/or direction between any two points in the atmosphere. It is generally not a serious hazard for aircraft en route between airports at normal cruising altitudes, but strong, sudden low-level wind shear in the terminal area can be deadly for an aircraft that is taking off or landing. Numerous, documented fatal aircraft accidents have been attributed to low-level wind shear, and have prompted the Federal Aviation Administration (FAA) to install wind shear detection systems at many domestic airports. These low-level wind shear events include microbursts, gust fronts and other meteorological phenomena. Low-level wind shear events are potentially hazardous in that they produce a sudden sharp reduction in airspeed and a loss of lift which can cause an airplane to stall and crash when flying at a low speed, such as when approaching an airport runway for a landing or departing on take off. It is therefore desirable to provide pilots with a runway-specific alert when a 15 knot (or greater) headwind loss or gain situation is detected in the region where the aircraft are below 1000 feet above ground level: generally within three nautical miles of the runway ends.

Existing adverse weather monitoring systems (FAA systems) include the Low Level Wind Shear Alert System (LLWAS) which uses sensors mounted on towers located at specific locations about an airport. The sensors measure wind velocity (magnitude and direction) and an automated algorithm detects horizontal wind shear by performing wind divergence calculations on the data collected from the sensors. If a wind shear is identified, data indicative of its location and magnitude are transmitted to the controllers at the airport control tower. A difficulty with this apparatus is that its ability to accurately identify wind shear is limited by the fact it only obtains wind velocity data from stationary ground level sensors, which are anemometers located in predefined locations about the airport. The sensors are sparsely located around the airport runways and, in general, are not situated out to the needed three mile extension off the runway ends. Hence, there is a lack of adequate spatial coverage both in resolution and total area coverage. These limitations can lead to a failure to detect the presence of a wind shear event or the improper classification (gain versus loss) of a wind shear event that is located outside of the spatial bounds of the anemometer network, yet which impacts the runway corridor. A related problem is the delay in detecting small microbursts that are located between anemometers and whose outflow has not yet reached these anemometers. Finally, the alert produced by LLWAS is in the form of an alphanumeric display, rather than a graphical display and therefore conveys a limited amount of information to the air traffic control staff.

A second adverse weather monitoring system is the Terminal Doppler Weather Radar (TDWR) which monitors atmospheric conditions using a Doppler radar sensor arrangement. The Terminal Doppler Weather Radar system utilizes a scanning Doppler radar, nominally situated ten to fifteen kilometers from the center of a given airport, to detect hazardous wind shear conditions. The TDWR system identifies the locus of these hazardous regions by processing radial velocity data at its lowest level scans. Regions of divergence are identified as microbursts and regions of convergence are identified as gust fronts. When these identified regions impact the runway corridors, alerts are generated and transmitted to air traffic personnel via alphanumeric and graphical displays. The limitations of TDWR system are: a relatively slow update rate, a reliance on atmospheric reflectors to make its measurements, and a radial-only velocity data. These limitations can lead to inadequate spatial and/or temporal detection of hazardous wind shear conditions.

Therefore, existing weather alert systems each have specific limitations to their abilities and, in some locations, both will be installed and concurrently operational. In these concurrent operation situations, the air traffic controller would be required to arbitrate between the two systems to determine whether an alert should be generated for a particular airport location. The use of this manual operator intervention lends itself to human error and burdens the operator with having to arbitrate between two sophisticated weather systems, each of which presents data in different form. The primary duty of air traffic controllers is to separate aircraft in the vicinity of the airport. These individuals should not have to interpret meteorological conditions, or the wind shear information that stand-alone wind shear alert systems present to them. This arbitration requires a significant amount of skill and training on the part of the operator, since misreading the data produced by these systems and failing to generate an alert when one is required can have disastrous consequences. The intent of these stand-alone systems is to automatically synthesize meteorological data, generate the appropriate wind shear hazard information and present this information in an unambiguous format to the air traffic control personnel.

SOLUTION

The above described problems are solved and a technical advance achieved in the field by the present improved low-level wind shear alert system that provides an improved method of identifying the presence and locus of wind shear in a predefined area. This system enhances the operational effectiveness of the existing LLWAS system by mapping the two-dimensional wind velocity, measured at a number of locations, to a geographical indication of wind shear events. This resultant geographical indication is displayed in color-graphic form to the air traffic control personnel and can also be transmitted via a telemetry link to aircraft in the vicinity of the airport for display therein. In addition, gust fronts are tracked and their progress through the predefined area displayed to the users.

This system can also integrate data and processed information received from a plurality of sources, such as anemometers and Doppler radar systems, to produce low-level wind shear alerts of significantly improved accuracy over those of prior systems. In particular, the apparatus of the present invention makes use of the data and processed information produced by the existing Low-Level Wind Shear Alert System as well as that produced by the Terminal Doppler Weather Radar to precisely identify the locus and magnitude of low-level wind shear events within a predetermined area. This is accomplished by the use of a novel integration system that utilizes the data and processed information received from these two systems in such a way that the limitations of the two stand-alone systems are ameliorated. This integration scheme, while addressing these limitations, simultaneously maintains the strengths of the two stand-alone systems. This technique then provides the best possible wind shear hazard alert information. Furthermore, this integration methodology addresses the operator interaction problem discussed above. The integration is fully automated, requires no meteorological interpretation by the users and produces the required graphical and alphanumeric information in an unambiguous format. Lastly, this integration technique is implemented fully without any major software modifications nor without any hardware modifications to the existing stand-alone systems.

The TDWR apparatus uses a 5 cm. C-band Doppler radar system to measure radial winds when atmospheric scatterers are present. This system processes the radar return signals to create a field of radially oriented line segments indicative of the radial velocity data received from the radar. The TDWR apparatus bounds isolated sets of segments that are above a predetermined threshold to define an area which would contain a specific, potential low-level wind shear event. The bounding is such that it incorporates the smallest area which includes all of the line segments above the predetermined threshold. A predefined geometric shape is used to produce this bounding and the characteristics of this geometric shape are adapted in order to encompass all of the required data points in the minimal area.

The apparatus of the present invention is divided into two independent sections: detection of wind shear with loss situations (microbursts, etc.) and detection of wind shear with gain situations (gust fronts, etc.). The TDWR system outputs wind shear with loss data in the form of microburst shapes. The enhanced LLWAS apparatus of the present invention generates equivalent LLWAS microburst shapes using the triangle and edge divergence values produced by the existing LLWAS apparatus. The LLWAS microburst shapes are validated by using auxiliary information from LLWAS and TDWR to eliminate marginal and false-detection LLWAS microburst shapes. The resultant two sets of microburst shapes are then considered for alarm generation purposes. The wind shear with gain portion of this system simply divides the coverage area into two regions, with TDWR producing wind shear with gain runway alarms for wind shear events that occur outside of the LLWAS sensor network while the LLWAS runway oriented gain alarms are produced for wind shear events that occur inside of the LLWAS sensor network.

This integration architecture enables the concurrent use of a plurality of sensor-based systems to provide the wind shear detection function with increased accuracy. Both ground-based and aircraft-based sensor systems can be used to provide wind data for this apparatus. The mapping the diverse forms of input data into a common data structure (predefined geometric shapes) avoids the necessity of modifying existing sensor systems and simplifies the production of information displays for the user. The use of a common information display apparatus and format renders the combination of systems transparent to the user.

DETAILED DESCRIPTION

Adverse weather conditions, especially those affecting airport operation, are a significant safety concern for airline operators. Low level wind shear is of significant interest because it has caused a number of major air carrier accidents. Wind shear is a change in wind speed and/or direction between two points in the atmosphere. It is generally not a serious hazard for aircraft en route between airports at normal cruising altitudes but strong, sudden low-level wind shear in the terminal area can be deadly for an aircraft on approach or departure from an airport. The most hazardous form of wind shear is the microburst, an outflow of air from a small scale but powerful downward gush of cold, heavy air that can occur beneath or from the storm or rain shower or even in rain free air under a harmless looking cumulus cloud. As this downdraft reaches the earth's surface, its spreads out horizontally like a stream of water sprayed straight down on a concrete driveway from a garden hose. An aircraft that flies through a microburst at low altitude first encounters a strong headwind, then a downdraft, and finally a tailwind that produces a sharp reduction in air speed and a sudden loss of lift. This loss of lift can cause an airplane to stall and crash when flying at a low speed, such as when approaching an airport runway for landing or departing on takeoff. It is therefore desirable to provide pilots with a runway specific alert when a fifteen knot or greater headwind loss or gain situation is detected in the region where the aircraft are below one thousand feet above ground level and within three nautical miles of the runway ends.

Figure 5:
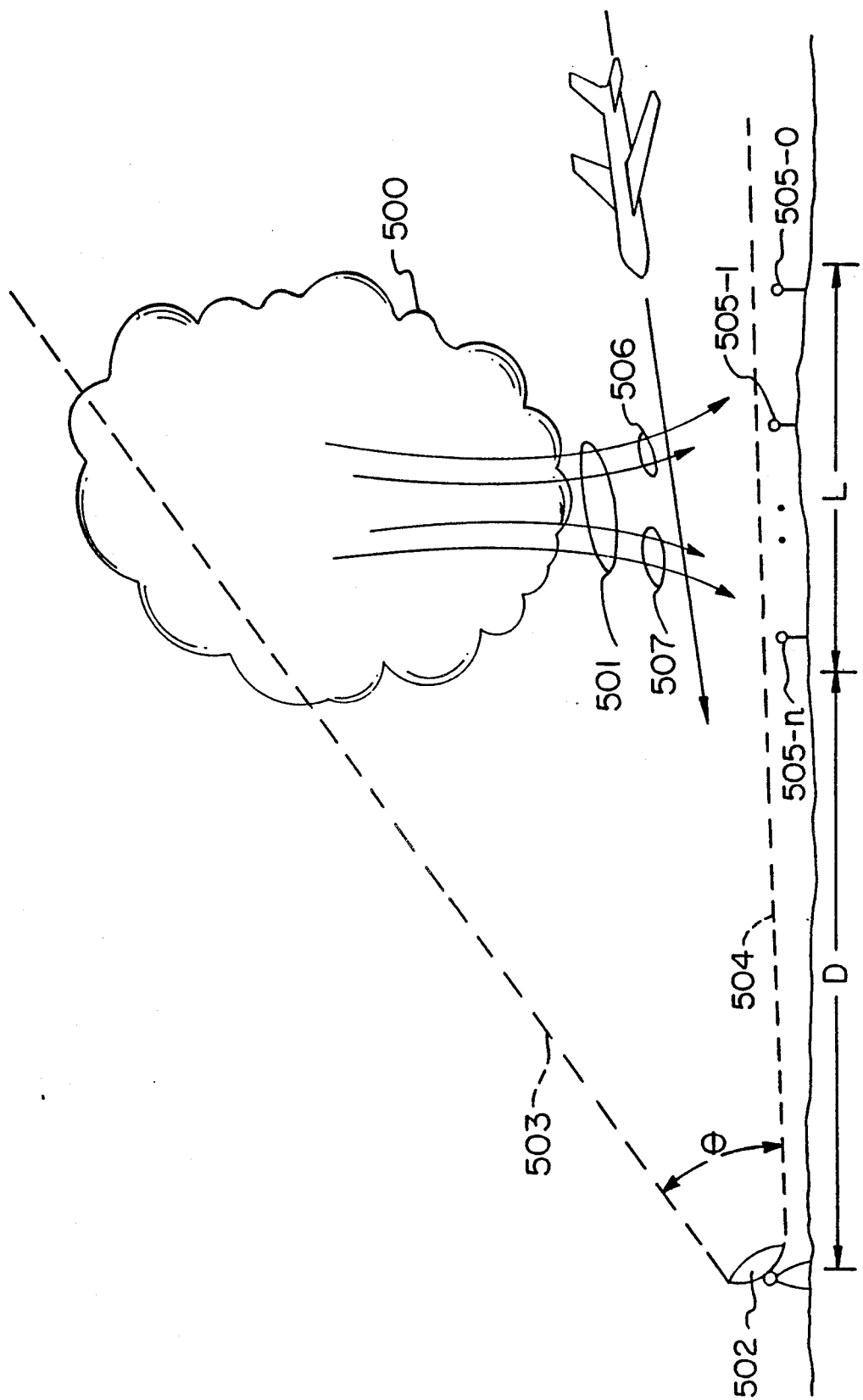
FIG. 5 illustrates a side view of a TDWR scan pattern.
Figure 6:
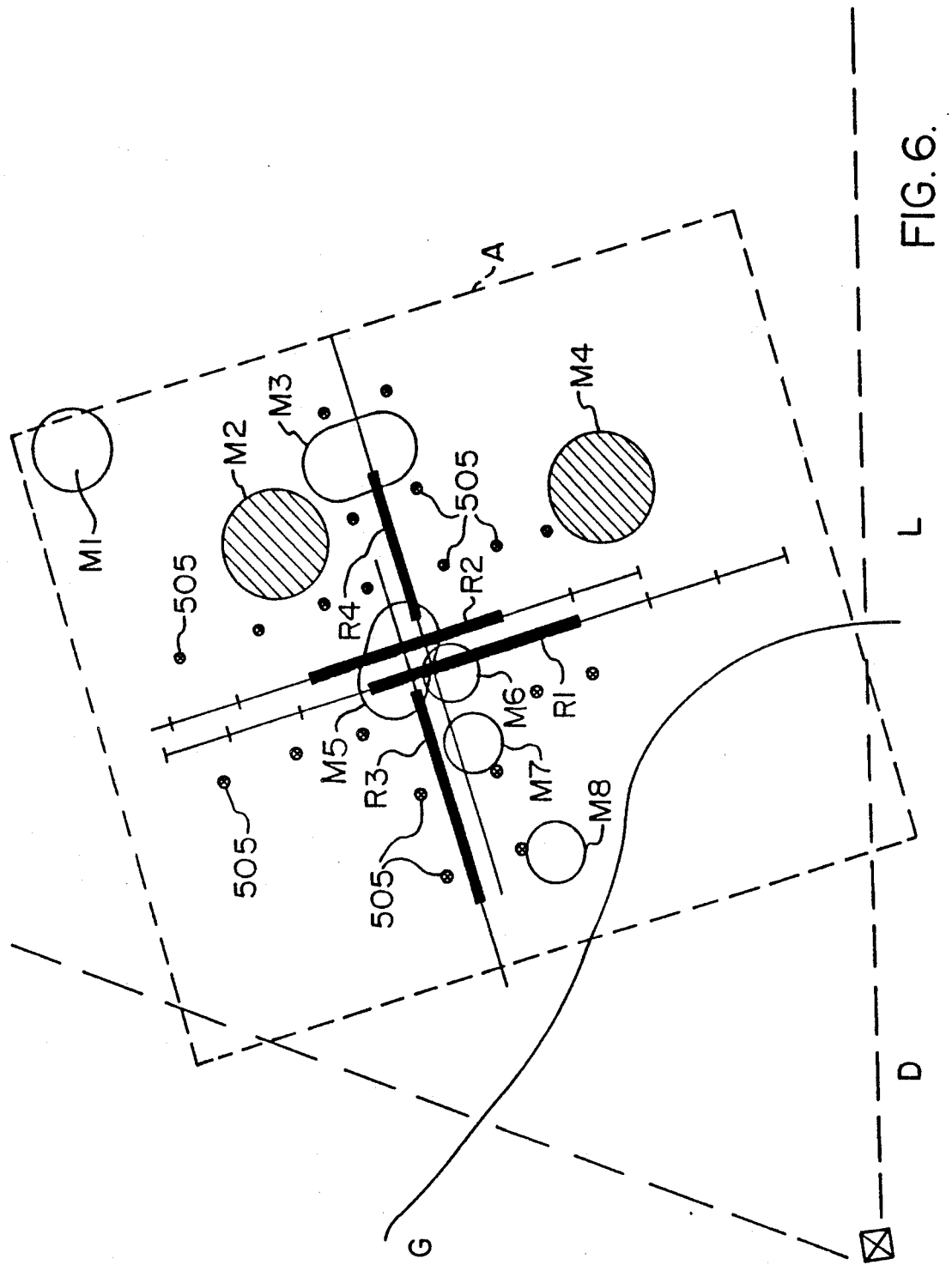
FIG. 6 illustrates a plot of a typical airport configuration, including LLWAS and TDWR installations and typical weather conditions.

FIG. 5 illustrates a side view of a typical airport installation wherein the airport is within the region indicated on the horizontal axis by the line labeled L and a Terminal Doppler Weather Radar system 502 is located a distance D from the periphery of the airport. FIG. 6 illustrates a top view of the same locale. Included within the bounds of the airport are a plurality of Low Level Wind Shear Alert System sensors 505. The sensors 505 are typically anemometers located two to four kilometers apart and are used to produce a single plane, two dimensional picture of the wind velocity within the region of the airport. The Terminal Doppler Weather Radar 502, in contrast, consists of a one dimensional (radial) beam which scans all runways (R1-R4) and flight paths but can measure only a radial horizontal outflow component of wind. The nominal TDWR scan strategy produces one surface elevation scan per minute and scans aloft of the operational region to an altitude of at least twenty thousand feet every two and a half minutes. This strategy is intended to provide frequent updates of surface outflow while monitoring for features aloft to indicate that a microburst is imminent. Microbursts (M1-M8) are recognized primarily by surface outflow although they can be anticipated to a certain extent by monitoring features and events in the region above the airport location.

In FIG. 5, the thunderstorm illustrated by 500 typically produces a powerful downward gush of cold heavy air 501 which spreads out horizontally as it reaches the earth's surface. One segment of this downflow 501 spreads out away (506) from TDWR radar 502 while an opposing segment 507 spreads out towards the TDWR radar 502. It is generally assumed that these outflows are symmetrical for the purpose of detecting microburst wind shears. Because most microbursts do not have purely symmetrical horizontal outflows, the TDWR system can have problems detecting or estimating the true intensity of asymmetrical microburst outflows. As can be seen from FIG. 6, the anemometers 505 of the Low Level Wind-Shear Alert System are sited on both sides of airport runways R1-R4 but do not extend to the full three mile distance from the end of the runway as is desirable. Therefore, the anemometers 505 can only detect horizontal airflows 501 that occur in their immediate vicinity (M2, M3, M5-M8) even though there can be horizontal airflow outside the anemometer network (M1, M4) that can impact airport operations but are outside of the range of the limited number of anemometers 505 sited at an airport.

Improved Wind Shear Alert System Architecture

Figure 1:
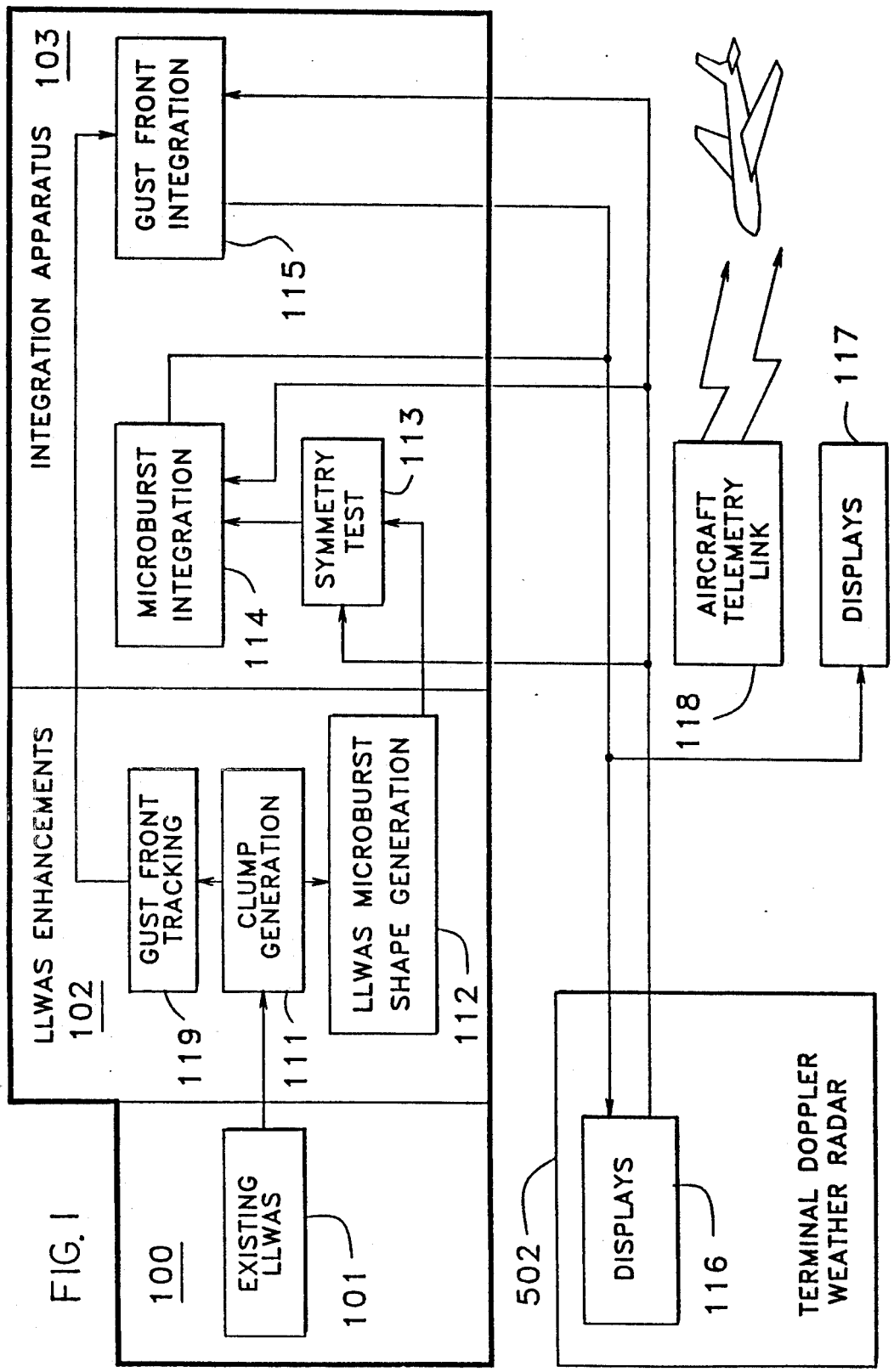
FIG. 1 illustrates in block diagram form the overall architecture of the weather alert system of the present invention.
Figure 7:
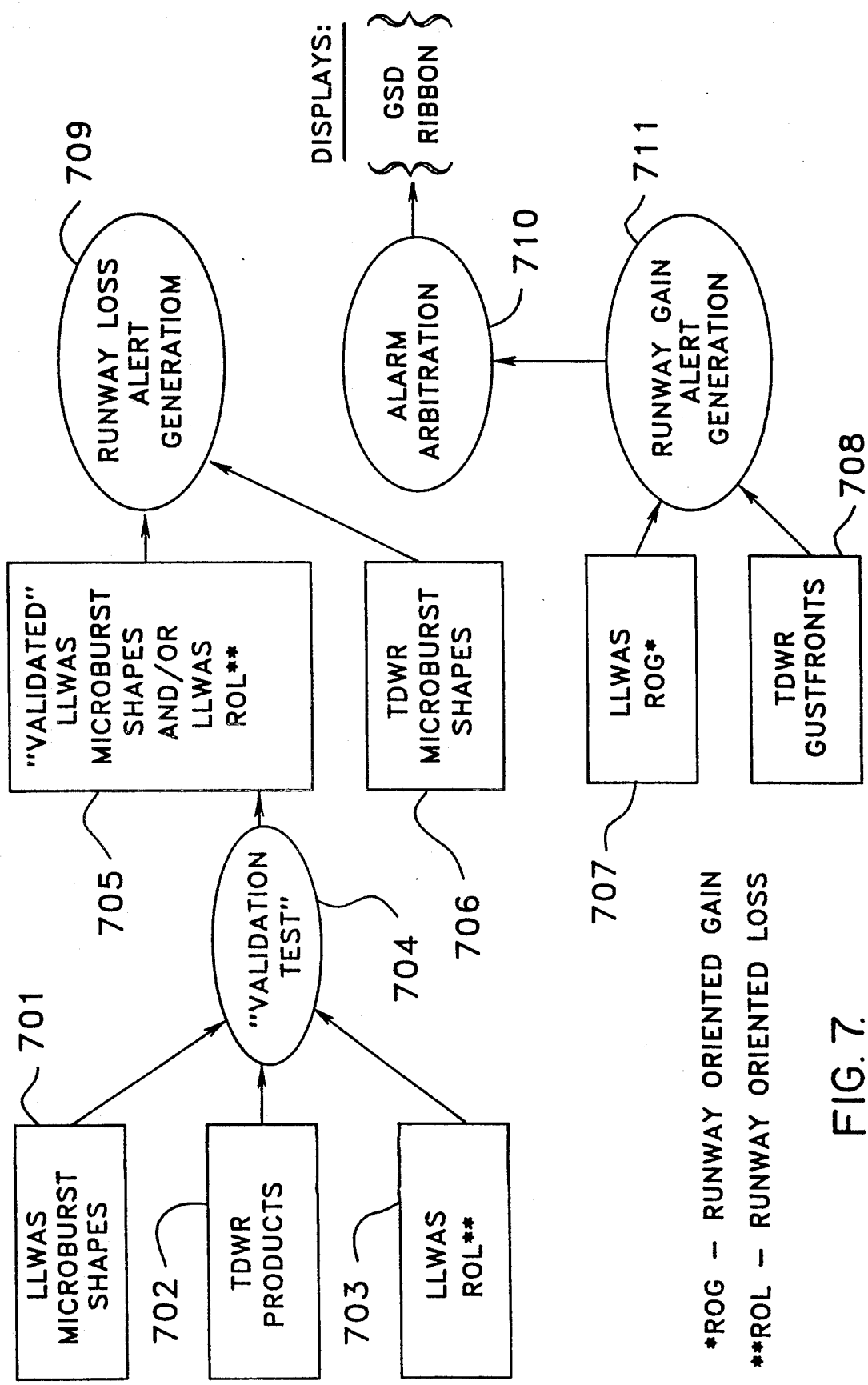
FIG. 7 pictorially illustrates the logic structure of the weather alert system of the present invention.

FIG. 1 illustrates in block diagram form the overall architecture of the weather alert system of the present invention, while FIG. 7 illustrates the logical structure thereof. This low-level wind shear alert system 100 integrates the ground level wind data collected by one set of stationary ground level sensor (anemometers) 505 with the higher altitude wind data collected by a second sensor (Doppler radar) 502 in order to accurately identify both the locus and magnitude of low-level wind shear conditions within a predetermined area A. The two sets of data inputs illustrated in this embodiment of the invention include the data produced by existing data processing systems associated with the sensors in order to preprocess the data prior to integration into the unified precise output presented to the end user.

The sensor systems include the existing Low Level Wind Shear Alert System (LLWAS) front end processing 101 which is an anemometer-based wind shear alert system used to detect the presence and identify the locus of wind shear events at or near ground level. The LLWAS system 101 generates data indicative of the wind velocity (magnitude and direction) at each of a plurality of fixed sites 505 located within a predefined area. The collected wind velocity data is then preprocessed by the LLWAS system 101 to identify the locus and magnitude of wind shears at ground level by identifying the divergence or convergence that occurs in the measured wind velocity throughout the predefined area. Similarly, the second set of sensors is the Terminal Doppler Weather Radar (TDWR) 502 which uses a Doppler radar system to measure low-level wind shear activity in the predefined area. The TDWR system 502 searches its radar scan for segments of the radar beam of monotonically increasing radial velocity. These regions and areas of radial convergence are identified as the locus of wind shear events.

The integration system 103 that has been developed for the integration of TDWR 502 and LLWAS 101 uses a product-level technique and is divided into two independent sections: the detection of windshear-with-loss situations (microbursts, etc.) and windshear-with-gain situations (gust fronts, etc.).

The outputs 706 from the windshear-with-loss portion of the TDWR system 502 are microburst shapes—which are used both as graphical information and to generate the textual runway alerts. As an integration "add-on" to the existing LLWAS system 101, an enhanced LLWAS section 102 was developed to generate LLWAS microburst shapes 701. These shapes are computed using triangle and edge divergence values obtained from the LLWAS system 101. Even though the methods used to generate these shapes is quite different, these LLWAS microburst shapes 701 are identical—in both form and content—to the TDWR microburst shapes 706. This allows for the same alert-generation logic 709 to be applied, and for the common graphical display 116 of microburst detections.

The TDWR/LLWAS (windshear-with-loss) microburst integration 114 is essentially the combined use of microburst shapes 705, 706 from each sub-system 112, 502. This combination, however, is not a spatial merging of the shapes: each shape is considered as a separate entity. Furthermore, the LLWAS microburst shapes 701 have been passed through a validation process in symmetry test 113. By this we mean that auxiliary information 702, 703 from both TDWR and LLWAS is utilized in an attempt to eliminate certain of the "weaker" LLWAS microburst shapes—ones that could generate nuisance or false alarms. The motivation and implementation for this procedure is described below. However, an alternative to this process, the sensor data from each of the sub-systems 112, 502 could be merged to produce a composite set of shapes indicative of the merged data. This alternative process is noted herein in the context of this system realization.

Once a set of microburst shapes are produced by the enhanced LLWAS apparatus 102 and integration apparatus 103, these shapes are transmitted to the Terminal Doppler Weather Radar system 502 which contains the runway loss alert generation process 709. Similarly, the integration apparatus 103 receives LLWAS runway oriented gain data 707 and TDWR gust front data 708 in gust front integration apparatus 115. The LLWAS runway-oriented-gain data includes data front tracking system 119 which uses the LLWAS anemometer wind vectors to detect, track, and graphically display gustfronts within the predetermined area. LLWAS runway-oriented-gain (ROG) is also used for detection of generic wind shear with gain hazards within the LLWAS network. This is not necessarily tied to a specific gust front detection. Wind shear with gain situations can occur independently of gust fronts—e.g. the leading edge of a microburst outflow, or larger-scale (meteorological) frontal passage. The selected data is then transmitted to the TDWR system 505 where a runway gain alert generation process 711 produces an alarm indicative of the presence of a wind shear with gain hazard.

Alarm arbitration process 710 in TDWR system 502 selects the alarm produced by either runway loss alert generation process 709 or runway gain alert generation process 711 to present to TDWR displays 116. The existing displays 116 consist of the TDWR Geographic Situation Display (GSD) which illustrates in graphical form the microburst shapes, gust fronts and indicates which runways are in alert status. The TDWR and LLWAS Ribbon Display Terminal (RDT) gives an alphanumeric message indicating alert status, event type, location and magnitude for each operational runway.

It is obvious from the above description that the existing LLWAS 101 and TDWR 502 systems are utilized as much as possible without modification to minimize cost and impact on existing installations. It is also possible to implement these features in other system configurations. Any other data collection system can be similarly integrated with the existing TDWR system 502 or the existing LLWAS system by the application of the philosophy described above. For example, the addition of another Doppler radar, or another anemometer network.

Shape Generation Philosophy

The LLWAS microburst shape computations are based upon the detection of divergence in the surface winds. These triangle and edge divergence estimates are mapped onto a rectangular grid. Contiguous "clumps" of above-threshold grid points are collected and then used to generate microburst shapes. Compensating for the spatial under-sampling of the true surface wind field inherent in the LLWAS data, a "symmetry hypothesis" is used in generating the location, extent, and magnitude (loss estimate) for these microburst shapes. This hypothesis is applied as if a symmetric microburst were centered at each (above threshold) grid point. In general, microburst outflows are not symmetric. However, the spatial superposition of these symmetric "grid-point-microbursts" in a given clump does a very good job of approximating a non-symmetric event.

While a given detected divergence may be real, the LLWAS data alone cannot be used to determine whether it is truly associated with a microburst. Therefore, the application of the symmetry hypothesis may not always be valid. The problem is two-sided. If the symmetry hypothesis is always used, it could generate false alarms in certain non-microburst situations. For example, strong surface winds setting up in a persistent divergent pattern. On the other hand, if the symmetry assumptions are never used, wind shear warnings for valid microburst events could be delayed, inaccurate, or even eliminated. The issue is then to determine whether a given LLWAS-detected divergence is associated with a microburst and hence determine whether the symmetry hypothesis should be applied.

The algorithm that was developed combined "features-aloft" information from TDWR: three-dimensional reflectivity structures and microburst precursors, (both projected down to the surface); and detected "strong" surface divergence (microburst shapes) from both TDWR 502 and LLWAS 101. This information is then synthesized, both spatially and temporally to create a set of geometric discs. The intent of these discs is to indicate a region of the atmosphere within and/or above the disc, (i.e. a cylinder), where there is good likelihood of microburst activity. This "region" could be in space: the detection of the surface outflow, or microburst features above the surface (reflectivity and-/or velocity signatures). It could also be in time, that is, a microburst is either: going to occur, is in progress, or has recently been present.

These discs are then examined for "closeness" to those LLWAS microburst shapes that are to be validated. If this proximity criteria is met, the LLWAS microburst shape is "validated" and passed onwards. That is, the use of the symmetry hypothesis is assumed to be appropriate in this case, and this LLWAS microburst shape is to be used for generating wind shear warnings and to be displayed on the GSD. If the proximity test fails, the LLWAS shape is discarded. However, in this latter circumstance, there could be a valid wind shear hazard occurring that is not associated with a microburst—or possibly a microburst that is not being correctly identified in the symmetry disc calculations. To prevent this type of missed detection, the LLWAS Runway-Oriented-Loss (ROL) information 703 is then used as a fall-back to generate any appropriate wind shear warnings.

Enhanced LLWAS System-Preprocessing

Figure 3:
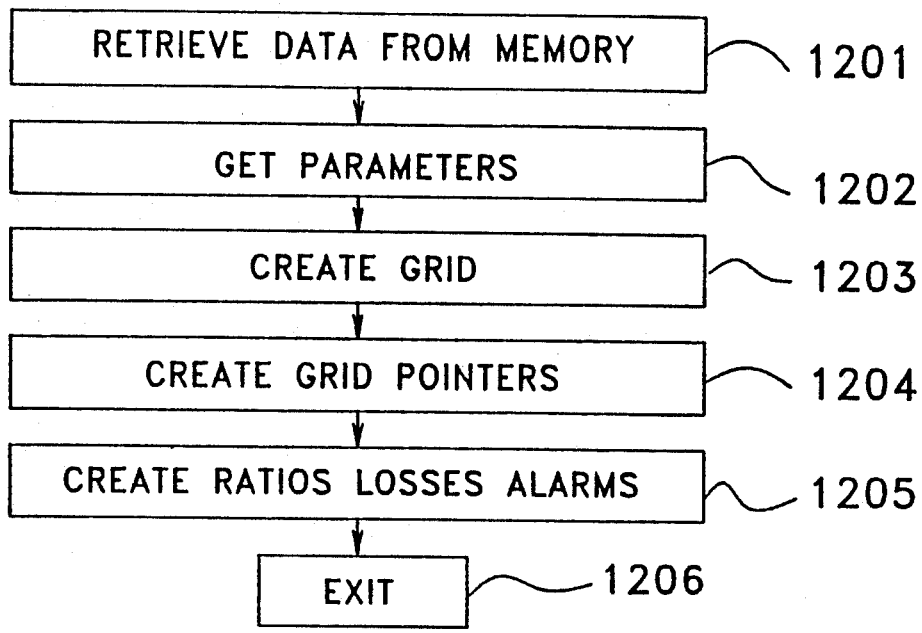
Figure 4:
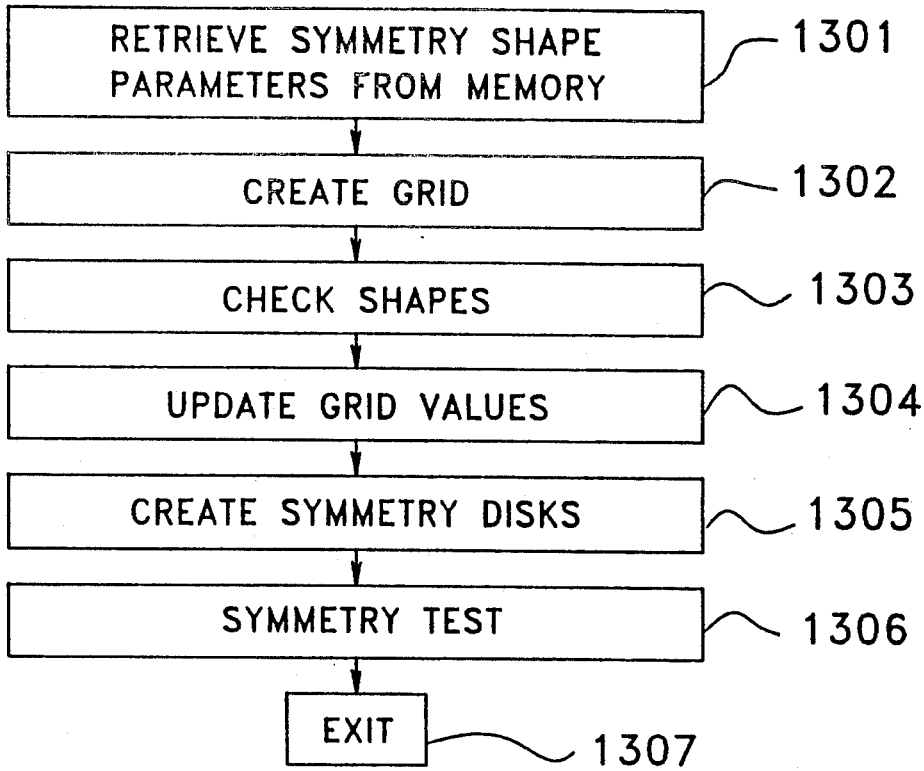

The enhanced LLWAS system creates a grid point table for use in creating microburst shapes. This process is illustrated in FIG. 3 and is activated at system initialization. As a preprocessing step, a set of pointers are generated which map triangle and edge microburst detection areas to an analysis grid. During real-time operation, LLWAS triangle and edge divergence values are then mapped onto the grid—applying a magnitude value at each grid point. This set of grid point magnitudes are used with the clumps produced by clump shape generation apparatus 111 to generate a set of low level wind shear alert system microburst shapes. The "pointers" for the mapping of triangle and edges to the grid is a "first-time-through", preprocessing step. This is done this way since the "pointer" information is solely a function of a given site's LLWAS anemometer network geometry-which doesn't change.

The preprocessing, location specific table data generation is initiated at step 1201 where the anemometer location values are retrieved from memory and, at step 1202 the site adaptable parameters needed to modify the calculations are also retrieved from memory. At step 1203, a grid is created by computing the number of grid points in an x and y Cartesian coordinate set of dimensions based on the number of input data points to create a minimal size xy grid to perform the computations. At step 1204, a set of grid pointers is produced to map the divergence estimates that are above a threshold value with the particular points in the grid system created at step 1203. This is to locate the center of a microburst that would be causing an alarm. Since a number of grid points are above the divergence element threshold value it is difficult to denote the location where the microburst to be centered which would cause these elements to create the alarm. Each sensor or network element is tested by placing a mathematical microburst at each grid point and each one of the grid points so tested that would cause the given network element to be an alarm status is then associated with that particular network element. As a result, a set of grid points associated with each Low Level Wind Shear Alert System 101 triangle and edge is produced to create the element grid point pointers. In order to perform this calculation, a symmetrical microburst model is used: a simplistic half sine wave model which is time invariant and symmetric in both space and magnitude and is only a function of amplitude and a maximum radius. Even though a real microburst may be spatially asymmetrical, it can be approximated by a linear superposition of a number of symmetrical microbursts at least to a first order mathematical expansion which produces sufficient specificity for this calculation process.

Once the above steps have been performed, the processing of measurement data begins at step 1205, where the Low Level Wind Shear Alert System triangle and edge divergence values are used to generate the corresponding sets of ratios of the divergence values to the thresholds, estimated loss values and alarm status. Associated with these grid points are two sets of magnitude values: the low level wind shear alert system divergence to threshold ratios and associated estimated loss values. The purpose of these two sets of magnitude information lies in the fact that, although the measured quantity is wind-field divergence (or windshear), the required output value to the users is a runway-oriented loss value. Hence a mapping from divergence to loss is needed.

The following data processing steps are done at each update of information from the LLWAS system:
1. Input of triangle and edge divergence values from LLWAS system.
2. Computation of "ratios" (divergence/threshold) for each triangle and edge.
3. Mapping of triangle and edge ratios to grid.
4. Clumping of grid points.
5. Shape generation from clumps.

Clump Generation Theory

Figure 2:
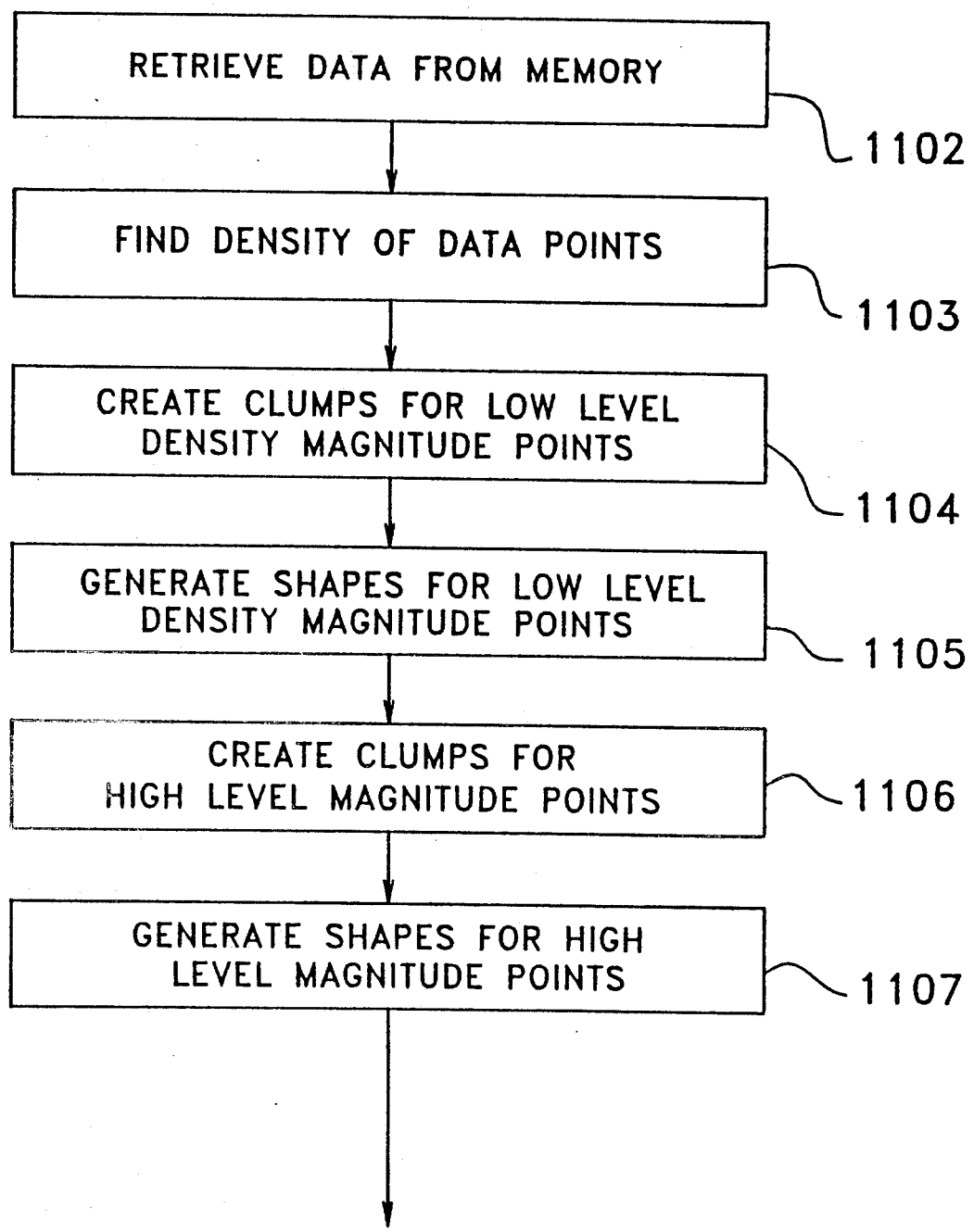
FIGS. 2, 3 and 4 illustrate in flow diagram form the operation of the various segments of the weather alert system of the present invention.

FIG. 2 illustrates in flow diagram form the clump generation process 111 which receives algorithm products from the Low Level Wind Shear Alert System 101 to produce an indication of the location of wind shear events. This routine accepts as an input the triangle and edge divergences produced by the Low Level Wind Shear Alert System 101. The clump generation process 111 then generates clumps of points that are above a certain input threshold level. These clumps are then output to the low level wind shear alert system shape generation algorithm 112. The grid points are the data collection points within the predefined area around the airport which area is presumed to be two dimensional rectangular area having a set of coordinates in the standard two dimensional rectilinear mathematical orientation with positive x values to the east and positive y values to the north. The clumps are generated by first finding grid points that are above a given threshold value.

In the pre-processing stage, a grid with 0.5 km by 0.5 km spacing is constructed over a region which covers the anemometer network 505. A simulated microburst is placed at each grid point and the divergence is computed for each network element. If the computed divergence for a given element is above that element's threshold, an "association" is made between the grid point and that element. In this manner, a table is constructed that connected all of the grid points to the network triangles and edges via a hypothetical divergence detection. This table is then employed in real-time using an inverse logic. Given that a network element detects a divergence above its threshold, a set of grid points (via the table) is associated with that divergence, since from the theoretical analysis these points are potential microburst locations.

Once these subsets of grid points have been identified, they are processed to generate "clumps" of contiguous groups of grid points. By contiguous, it is meant that adjacent up, down, right, or left points are considered, not those along the diagonals. Three sets of clumps are generated to include grid point threshold data representative of "low-level", "high level", and "low-level-density" collections of grid points. The "low-level" and "high-level" grid points are indicative of the magnitude of the estimated wind divergence at those particular grid points. The "high-level" grid points are representative of a secondary threshold used to distinguish the grid points that have significantly exceeded the initial threshold. This secondary threshold thereby differentiates wind shears of significant magnitude from those of moderate magnitude.

"Low-level-density" grid-point clumps are identical to those for the low level and high level process discussed above but represent a condensation of a large number of grid points, which number would be overly large or the resultant geometric pattern would be concave or extended in nature. An example of such a problem would be a collection of grid points that are located in a figure eight shape. In order to reduce the collection of grid points into small, convex and compact patterns, a density weighing operation is performed on the low level grid point values. In order to accomplish this, the original magnitude of each grid point is multiplied by a local neighborhood occupation density weight to compute a new magnitude value at each grid point to thereby more accurately reconfigure the geometric pattern of these grid points. The density weight is a normalized value between zero and one which is generated by any one of a number of mathematical methods depending upon a given point's location in the grid. For example, the neighborhood set of points for a given interior point are the eight adjacent points including the diagonals and the given point itself. The number of points in this set that are above a threshold value are summed and this total number is divided by the number of grid points that are in the original neighborhood set. These density weighted points are then formed into clumps in an identical fashion as for the low level and high level computations to form the low level density geometric clumps. This procedure condenses the collection of grid points into more compact patterns and also separates overly extended clumps into a set of smaller, compact clumps.

Preferred Geometric Shape

A single preferred geometric shape is used throughout these computations in order to have consistency and simplicity of the calculations. The preferred shape disclosed herein is a semi-rectilinear oval akin to the shape of a band-aid that is, a rectangle with semi-circle "endcaps" (these microburst shapes are the same as the TDWR shapes). This shape is mathematically defined by an axis line segment having two end points and a radius used at each of the end points to define a semicircle. This geometric shape is produced for each clump such that the axis line segment has the minimum weighted squared distance from all of the grid points that are within this given clump and furthermore, this shape encloses all of the clump's grid points. In cases where the shape is overly large or concave in nature, the shape is processed to create a number of smaller shapes which enclose the grid points. This shape is produced such that it is of minimum area after satisfying these conditions. A further processing step, a least-squares size reduction, is then performed to "trim" overly large shapes. In computing the shapes for microbursts, the magnitude information used is the ratio of the calculated divergence to the threshold that is mapped from triangles and edges into the grid points. A given grid point's ratio value is generated as follows. First, a ratio for each LLWAS network element: (triangle and/or edge), is computed. This ratio is the ratio of that elements' detected divergence estimate and that elements' divergence threshold value. This predetermined threshold is designed to indicate hazardous windfield divergence, is computed based upon a mathematical microburst simulation, and takes into account the geometrical nature of the given triangle or edge. Another set of magnitude information used is an associated loss value estimate for each point, based on these divergences. The microburst shapes are calculated at the "wind shear alert" (WSA) level using the low level density clumps, least squares shape size reduction and the statistical shape magnitude computation. The other set of geometric shapes is at the "microburst alert" (MBA) level using the high level clumps, least squares reduction and the maximum value of magnitude computation.

Clump Generation Process

FIG. 2 illustrates in detailed flow diagram the clump generation process 111 which process is initiated at step 1102 where the data is received from the associated low level wind shear alert system 101 and stored in memory. At step 1102, the clump generation process 111 converts the low level magnitude points into local occupied neighbor density weighted magnitude values. This process as discussed above uses all of the low level input magnitude values and computes new values for these points based on the density of adjacent data points that have exceeded the initial predetermined threshold. Each given data point that is above the input threshold value is given a density weight which is a number between zero and one indicative of the number of contiguous grid points, including the given point that are above the input threshold value, divided by the total number of contiguous points. That is, for an interior point the density weight is the number of neighboring points above the input threshold value divided by nine. This is because the contiguous points are defined as the adjacent points to the left, right, up, down and the four diagonal points in this xy Cartesian coordinate system. Once this set of density weighted values have been computed, processing advances to step 1104 wherein the initial groupings of data points is accomplished by grouping the grid points that have exceeded the threshold value into contiguous groupings. Concurrently with the operations on low level density data points, or subsequent thereto, the steps 1105 and 1106 are executed on the high level magnitude points to perform the same contiguous grouping function of steps 1102 and 1103. The set of groupings is then used at step 1106 by the shape driver to generate the predetermined geometric shapes of minimum area.

Using points that are still inside the shape after radius reduction compute the least squares reduced axis segment to produce a new reduced axis line segment. The resultant reduced shape axis line segment is then converted into the original, non-rotated Cartesian coordinate system and the overall magnitude for the shape is computed. The resultant shape consists of a line whose end points represent the center of a semicircle of predetermined radius which end point semicircles when connected by straight line segments create a band-aid shape to enclose all of the data points in a minimal area whose magnitude has been calculated. Similar processing of the input data takes place for the high level magnitude points in steps 1106 and 1107 the processing of which can occur sequentially or in parallel with the operation of steps 1104 and 1105. Once the shapes and their magnitude have been calculated for both the low level density magnitude points and the high level magnitude points processing exits at step 1109.

Shape Production

As noted above, this predetermined geometric shape is a band-aid shape which is defined by an axis line segment having two end points and a radius used at the end points to produce two semicircular shapes. This process is illustrated in flow diagram form in FIG. 3. The process is initiated by retrieving all of the grid points in one of the above noted sets and storing these in memory. Using these stored grid points, the measured or calculated magnitude of each grid point in a clump is normalized. Once all of the grid point values in the set have been normalized, a weighted least squares line is fit through these points using a standard weighted least squares technique. This produces the best line fit through all of the valid points in the input set of grid points. Once the weighted least squares line has been produced, the ends of this line segment are calculated by projecting all of the data points in the set onto the computed least squares line. The process uses the coordinates of each of the data points and the slope of the computed least squares line through these points. The coordinates of the clump points are put into a rotated coordinate system such that the least squares line is horizontal. The output from this calculation is the clump point coordinates in this rotated system and the axis line segment end points also in this coordinate system. The first set of coordinate values of this rotated end point is the leftmost point on the line representative of the smallest x value in the rotated xy Cartesian coordinate system and the second coordinate output is the rightmost point representative of the largest x value in this Cartesian coordinate system. Once the ends of the shape line segment have been determined all of the subsequent computations are done in the rotated coordinate system. The radius of the shape that encloses the points and is of minimum area is calculated by using a one dimensional smooth-function, (i.e., monotonic) minimization routine.

Shape Area Minimization

The minimization function is then activated to compute the radius that minimizes the shape area and using this new radius a review is made to determine whether the axis line segment end points can be modified in view of the determined radius. This is done by projecting the valid data points in the current set onto the computed least squares line and computing new end points as discussed above. Once this is done, the axis length is reduced if possible by moving the axis end points towards the axis segment bary center using a weighted least squares reduction of the horizontal distance from clump points to the closest shape boundary. By closest, it is meant that these points are partitioned into three sets: a set whose x values are less than the shapes bary center, a set whose x values are greater than the shapes bary center and a set of points that were originally associated with the shape but after radius reduction are now outside the shape. The normalized weights are selected to be a function of points magnitude and its distance to the axis segment bary center. The process uses the current access line segment end points and computes the barycenter of the current axis line segment and initializes the minimization iteration interval.

If the shape so generated is too large, it is dissected into a plurality of shapes. The test of excessive size is that the length of the axis line segment plus twice the radius is greater than a predetermined threshold. If so, the axis line segment is divided into smaller and potentially overlapping pieces. The grid data points originally associated with the original clump are then associated with the corresponding subshapes. If there is an overlap of the multiple shapes, the grid data points can be associated with more than one shape. The resultant plurality of shapes more accurately reflect the concurrent existence of multiple adjacent or overlapping wind shear events.

Least Squares Shape Size Reduction

Figure 8:
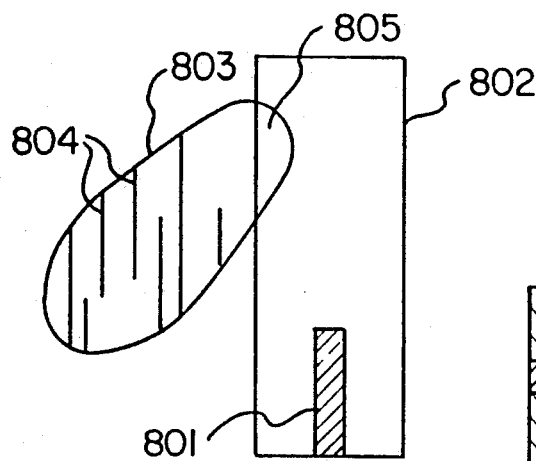
FIG. 8 illustrates the limitations of alert generation using TDWR generated shapes.
Figure 10:
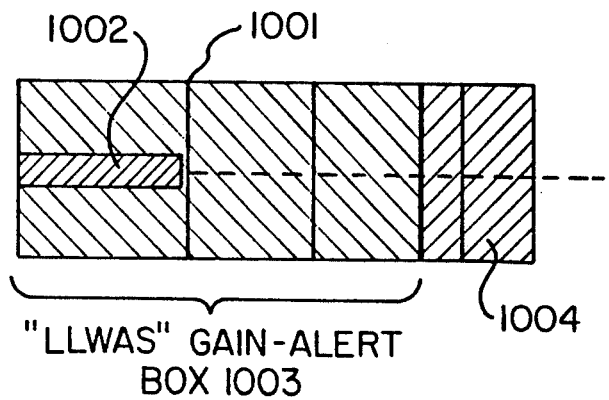
FIG. 10 illustrates the wind shear with gain integration pattern.

This process provides for a simple, efficient and mathematically rigorous method for more precisely indicating the hazardous microburst region. The original microburst shape algorithm—still used in the TDWR system, requires that all of the shear-segments 804 (the "runs of radial velocity increase") be enclosed within the microburst shape(s) 803. (FIG. 8) If the locus of these shear segments 804 is overly extended and/or fairly concave in geometrical structure, the "all enclosing" shape 803 can be too large. That is, it may contain non-hazardous regions 805. This can generate false alarm warnings as a runway alarm is generated when any portion of a microburst shape 803 intersects a predefined box 802 around a given runway 801. This same situation applied with the LLWAS microburst shapes. Where herein, we are concerned with overly extended and/or concave grid point clumps, as opposed shear-segment clusters, though the concept is identical. The solution to this documented "overwarning" problem has been developed in the context of the least-squares reduction of the shape-size for the LLWAS microburst shapes in the apparatus of the present invention.

A further contribution of the "overwarning" problem, is in the generation of the "magnitude" of the runway alert. That is, after a given microburst shape 803 intersects a "runway alert-box" 802, a magnitude for the alert must be computed. Again, the technique used for the TDWR stand-alone system is fairly simplistic and tends to over-estimate the hazard magnitude. These over-estimates are often viewed as false-alarms by the pilots. Therefore, again in the context of the LLWAS microburst shapes, a simple, efficient and mathematically rigorous methodology is used in the apparatus of the present invention. This algorithm employs a statistical estimate for a given microburst shape's magnitude.

Figure 9:
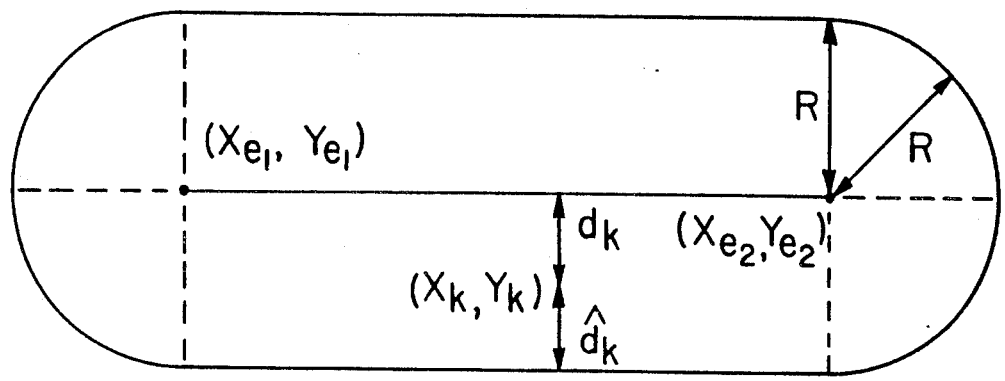
FIG. 9 illustrates the geometric shapes used in this system.

A shape is defined by two axis end points: $(X_{e1}, Y_{e1})$ and $(X_{e2}, Y_{e2})$, $[X_{e1} \leq X_{e2}]$ and a radius R. (FIG. 9) The shape is generated initially by finding the line which, in a least squares sense, (weighted by magnitude) best fits the set of points in a given "clump". These clump points essentially reflect the divergence magnitude at those points in space—as estimated from the LLWAS wind field.

The radius is then found by an iterative procedure which minimizes the area of the shape while simultaneously requiring that all points in the clump are enclosed. This technique is identical to the procedure used for TDWR, which uses "segment endpoints" as opposed to "points in a clump". Next, we try to reduce the shape size so that it gives a better fit to the points. This is done because the original criteria that all points be enclosed, tends to result in overly-large shapes when the clump is fairly concave. A further undesired complication occurs because of the generally "weaker-magnitude" points on the edges of the clump. This can be conceptualized by considering a symmetrical microburst outflow. The clump points can be viewed as describing contour-levels of divergence. The "center" of the clump being the "center" of the microburst outflow. The highest level of divergence would be at the center of the microburst outflow, then monotonically decreasing in magnitude with increasing distance from the center. The shape's radius is first reduced, then the axis length. Both are done using a weighted least squares technique.

Reduction of the Shape Radius

What we do here is reduce the (weighted) distance of the (originally) enclosed points, $(X_k, Y_k)$, to the shape boundary.

We have that $R = d_k + \hat{d}_k$, where R is the original radius, $d_k$ is the perpendicular distance from the point to the shape axis (or axis endpoint if $X_k \leq X_{e1}$, or $X_k \approx X_{e2}$), and $\hat{d}_k$ is the distance from the point to the boundary.

Therefore, we minimize $\hat{d}_k = R - d_k$, which leads to the weighted least squares equation for R, the new radius:

$$\sum_{k=1}^{n} W_k(\widetilde{R} - d_k) = 0,$$

which has the solution:

$$\widetilde{R} = \sum_k W_k d_k,$$

when we choose a set of normalized weights $W_k$, $\Sigma W_k = 1$.

We define the weights to be:

$$W_k = \frac{m_k d_k}{\Sigma m_k d_k}$$

where $m_k$ is the given magnitude at each point. This weighing is used to remove the bias generated by the relative higher density of the internal points. This can be understood by considering a shape which is a disc, and whose constituent clump-points all have equal magnitudes. If the weighing function only considered magnitudes, then the least squares radius reduction would always attempt to make a new disc of minimal-radius. The use of the distance values in the weighing function is designed to counteract this tendency. Furthermore, we choose a coordinate system rotated such that the axis is horizontal.

$$Y_1^* = Y_1^* = Y, X_k \Sigma X_k^*, Y_k \Sigma Y_k^*$$

(* indicating rotated coordinates)

In this coordinate system, the $d_k$'s are given by:

$$d_k = \begin{cases} [(X_k^* - X_{e1}^*)^2 + (Y_k^* - \overline{Y})^2]^{\frac{1}{2}}; & X_k^* < X_{e1}^* \\ |Y_k^* - \overline{Y}|; & X_{1e}^* \leq X_k^* \leq X \\ [(X_k^* - X_{e2}^*)^2 + (Y_k^* - \overline{Y})^2]^{\frac{1}{2}}; & X_k^* > X_{e2}^* \end{cases}$$

Reduction of the Shape Axis Length

Next, we reduce the axis length by (separately) moving the axis segment endpoints toward the segment mid-point. We use a least squares reduction of the horizontal (in rotated coordinates) distance from a given point to the (closest) boundary. Note: the axis is reduced only when the axis length is longer than a threshold length (approximately 1 km). By "closest", we mean that the clump points are partitioned into three sets: a set whose X-coordinates are less than the shape axis segment's mid-point, $\overline{X}$; one "greater-than" $\overline{X}$; and a third set consisting of those points that (after radius reduction) are outside the shape. We do not use this third set of points since their (horizontal) distance to the boundary is (now) undefined.

$$X_D^* = \frac{X_{e1}^* + X_{e2}^*}{2}$$

Therefore, the problem we are trying to solve (for a generic endpoint "e") is:

$$\widetilde{d_k} = d_k - (X_e - \widetilde{X_e})$$

where $d_k$ is the horizontal (X*) distance from point k to the boundary; $\widetilde{d_k}$ is the (eventual) least squares distance; $X_e$ and $\widetilde{X_e}$ are similarly the original and least squares endpoints.

The new endpoint we want is:

$$\widetilde{X_e} = \Sigma W_j(d_j - X_e)$$

where the set of points j refers to either points greater than $\overline{X}$ for the "right" endpoint or less than $\overline{X}$ for the "left" endpoint, respectively. The weights are chosen to be:

$$W_j = \frac{m_j|X_j^* - X|}{\Sigma m_j|X_j^* - X|}$$

where:

$$\Sigma W_j = 1$$

As before, the weights are chosen to reduce over-bias by points close to $\overline{X}$.

The horizontal (X)-distance to the boundary $d_j$ is given by:

$$d_j = L_j - \Delta X_j$$
$$= (\widetilde{R}^2 - Y_j^{*2})^{\frac{1}{2}} - (X_j^* - X_e^*).$$

The value we want to minimize is then:

$$d_j - X_e^* = (\widetilde{R}^2 - Y_j^{*2})^{\frac{1}{2}} - X_j^*$$

where $L_j$ is the horizontal distance from the point ($X_e^*$, $Y_j^*$) to the least squares reduced boundary, and $\Delta X_j$ is the horizontal distance between $X_j^*$ and $X_e^*$:

$$L_j = (\widetilde{R}^2 - Y_j^2)^{\frac{1}{2}}$$

(R is the least squares reduced radius)

$$\Delta X_j = X_j^* - X_e^*$$

Therefore, the new endpoint, $\widetilde{X}_e$ is given by (again in rotated coordinates):

$$\widetilde{X_e} = \Sigma W_j[(\widetilde{R}^2 - Y_j^{*2})^{\frac{1}{2}} - X_j^*]$$

where:

$$W_j = \frac{m_j|X_j^* - X|}{\Sigma m_j|X_j^* - X|}$$

Note: the same values result for points between $\overline{X}$ and $X_e^*$, and $X_e^*$ and the boundary. Furthermore, the same result applies to points on either side of $\overline{X}$. That is, the same equations apply equally for both sets of points "j" (partitioned based upon being less-than or greater-than $\overline{X}$).

LLWAS Microburst Shapes—Magnitude Computation

This routine computes an overall magnitude estimate for a given shape. The technique is to assume a Student's t-statistic distribution for the magnitudes for the set of points associated with the shape. The shape magnitude is then the percentile value given by the mean magnitude plus "K" standard deviations. This is an application of the well-known "confidence interval" technique from statistical theory. This distribution was chosen for its applicability to small sample sets and its approximation to a normal distribution for sample sets of around thirty elements or more. Furthermore, the value of "K" that has been used (k=1.0), was chosen to approximate an 80 to 90$^{th}$ percentile value over a wide range of degrees of freedom, (which is the number of points minus one).

Symmetry Test

Symmetry test apparatus 113 validates the microburst shapes 701 produced by microburst shapes generator 112 based on the auxiliary information produced by the features aloft and shape 702 information obtained from the Terminal Doppler Weather Radar System 502. This validation determines if there is supporting evidence that a given LLWAS microburst shape, is truly associated with a microburst. That is, the shape that is generated from the detection of surface wind field divergence can be associated with either a microburst or some other type of wind field anomaly, such as thermal activity, noisy winds, etc. Since symmetry assumptions are implicit in a generation of microburst shapes and these assumptions are based on the association of the surface divergence with the microburst. In non-microburst situations, these assumptions can lead to the generation of unwanted false alarms. This symmetry test procedure 113 removes the unwanted alarms by reviewing reflectivity and microburst precursor information from the Terminal Doppler Weather Radar system 502. These inputs are combined spatially and temporally to form symmetry disks whose presence indicates the possible existence of a microburst within or above its boundary. The given microburst shape that is to be validated by the symmetry test 113 is then tested for its proximity to a symmetry disk. Therefore, a weak microburst shape that is close to a symmetry disk is validated and those that are not are presumed to be an erroneous detection.

This symmetry test 113 is initiated at step 1301 with retrieval of site specific parameters from memory to modify the calculations based on local climatological conditions and sensor configuration. At step 1302, a rectangular grid in the xy Cartesian coordinate system is produced consisting of a minimal size grid necessary to analyze the calculated shapes. At step 1303 the microburst shapes are selected whose magnitude are equal to or greater than a site adaptable threshold. At step 1304 the present grid point values are computed based on current Terminal Doppler Weather Radar features aloft information and any Terminal Doppler Weather Radar or Low Level Wind Shear Alert System microburst shapes. The features aloft inputs are in the form of disks described by an xy center coordinate, a radius, and a type: low reflectivity, storm cell, reflectivity core or microburst precursor disks. A magnitude value for each of these features aloft disks is assigned based upon its type. The microburst shapes herein are those that have been filtered out previous to this routine and exceed the predetermined threshold values. Therefore, all of the Low Level Wind Shear Alert System and Terminal Doppler Weather Radar shapes computed are screened to come up with a composite set of shapes that exceed a given threshold value. For each disk that impacts the analysis grid that has been produced, specific grid points within that disk have their magnitude updated based on the nature of the disk. Each grid point magnitude value is time filtered with a single pole recursive filter to enforce a sense of time continuity. This set of filtered magnitudes is then the output of this routine to the create symmetry disks step 1305. The disk magnitudes are selected by appropriately choosing base or minimal values for each input set so that the features aloft disk type relates to the value of the actual loss magnitudes. Once these grid values have been established, at step 1305 the symmetry disks are created using a slightly modified version of the clump and shape generation algorithm discussed above. Once these shapes have been created at step 1305, at step 1306 the symmetry test is performed to validate the weaker Low Level Wind Shear Alert System microburst shapes. The LLWAS microburst shapes and symmetry disks are the input to this step. Any Low Level Wind Shear Alert System microburst shape whose magnitude is equal to or above a threshold value automatically passes the test. Otherwise, a circumscribing disk is created around each of these weak shapes and a test is performed to see whether a given Low Level Wind Shear Alert System disk is close to any symmetry disk. If it is, then that Low Level Wind Shear Alert System shape passes the test. The output of this process is a list of logical values for each of the input Low Level Wind Shear Alert System microburst shapes to indicate results of this symmetry test with a true value indicating that the shape has passed the test and is valid for use in creating a microburst alert.

Microburst Integration

The microburst integration apparatus 114 is the driver of the microburst portion of the integration apparatus. This apparatus converts the Terminal Doppler Weather Radar microburst shapes 702 and validated microburst shapes output by symmetry test apparatus 113 and the Low Level Wind Shear Alert System microburst shapes 701 into runway specific alerts for any regions on the operational runways (arrival R1, departure R1, etc.) that are defined for the physical runways R1–R4 in the associated predetermined area which are affected by the shapes. The regions so affected are combined with the Low Level Wind Shear Alert System runway oriented loss alarms 703. The Low Level Wind Shear Alert System inputs to this microburst integration apparatus 114 are the runway oriented losses 703 that are the outputs produced by the Low Level Wind Shear Alert System 101. The microburst integration apparatus 114 produces arrays containing the magnitude and location of any loss alarm as mapped onto the runway configuration within the predetermined area. The microburst integration apparatus 114 receives Terminal Doppler Weather Radar microburst shapes 702 from the Terminal Doppler Weather Radar system 502 and converts these by mapping them into runway specific locus and magnitude indications to produce runway alarms. In addition, microburst shapes 701 that are computed from the Low Level Wind Shear Alert System 101 as validated by the symmetry test apparatus 113 are also converted into runway alarms once they have sufficient magnitude or the symmetry hypothesis of symmetry test apparatus 113 substantiates their existence. In addition, any Low Level Wind Shear Alert System runway oriented losses 703, as produced by Low Level Wind Shear Alert System 101, that are concurrent with any Low Level Wind Shear Alert microburst shapes are converted into alarms and combined with the above noted Terminal Doppler Weather Radar microburst shapes and Low Level Wind Shear Alert System microburst shapes and output as a combination of alarms.

(1) Generation of Runway Specific Alerts (a) find alerts that would be generated individually by TDWR and validated LLWAS microburst shapes. This is done by the inherent TDWR logic which finds the intersection of a given shape with an "alert box" (nominally a rectangle around the operational runway path—½ nautical mile to either side and extending to 3 N.Mi off the runway end). This is done for each microburst shape. [The LLWAS-generated runway-oriented-loss (ROL) value(s) are only used when an LLWAS microburst shape is generated—but then not validated via the symmetry-test algorithm.] Then the overall alert for the given operational runway is computed by finding the "worst-case" magnitude and "first-encounter" location: from all the "interesting" shapes and the ROL's for the runway.

(2) Display Information (a) The above logic is for generating the runway alerts. That information is then relayed to the ribbon display terminals for the air traffic controllers, who then transmit it to any impacted aircraft. The same information is also displayed on the geographical situation display by "lighting-up" the appropriate runway locations.

(b) The TDWR and validated LLWAS microburst shapes are also displayed on the geographic display terminals.

The above-mentioned "worst-case" magnitude and "first-encounter" logic is further applied down-stream after the gust-front integration alerts are separately generated. That is, there can —and often is—multiple types of alerts for a given operational runway. Again, to avoid user-interpretation and confusion issues, only one alert is generated for a given operational runway at a given time. Therefore, the above logic is applied for all alerts for a runway. That is, alerts are separately generated for losses microbursts etc. and gains (gust fronts, etc.) then a single "worst-case" alert is generated. However, microburst alerts (losses≧30 knots) always take precedence. That is, if there is concurrently a 35 knot loss and a 45 knot gain—the 35 knot loss is used. This is because a wind shear that would generate a very hazardous loss (i.e.≧30 knots) is considered to be more significant for the aircraft.

Gust Front Integration

Gust front integration apparatus 115 as noted above, simply switches between the runway oriented gains 708 obtained from the Low Level Wind Shear Alert System 101 in the anemometer 505 network and that 709 obtained from the Terminal Doppler Weather Radar 502 relating to the area outside of the anemometer 505 network.

Description of "Gust Front Integration" Algorithm

First, define an "operational runway alert region". This is essentially though not necessarily a rectangular box 1001 surrounding a given runway 1002: nominally ½ nautical mile to either side of the runway, and extending three nautical miles beyond the runway (in the direction of use).

Next, this box partitioned into two distinct sub-regions: the "LLWAS gain alert region" 1003 and the (possibly null-sized) "TDWR gain alert region" 1004. The LLWAS region 1003 is the portion of the total rectangular box 1001 that goes from the beginning of the runway 1002, out to the location (along the runway) of the extremal LLWAS anemometer. The TDWR region 1004 is what is left over.

Runway oriented gain alerts are generated as follows. (Note use of "gain" as opposed to "gust-front". "Gain" is a more generic terminology, as a wind shear-with-gain, i.e., a situation in which an aircraft would experience a headwind-increasing wind shear ("gain"), can occur from more than just "gust fronts".) The LLWAS stand-alone system generates "runway-oriented-gain" (ROG) alerts for each operational runway at each LLWAS system update. (Obviously, not all runways actually have a ROG alert at any given update nor are all runways in alert status for a given wind shear-with-gain situation.) This LLWAS ROG (when in alert) gives both a location and magnitude for the LLWAS stand-alone alert.

Figure 11:
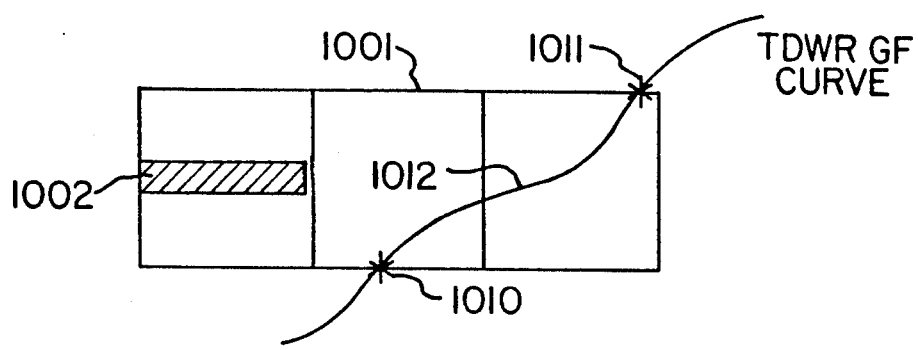
FIGS. 11 and 12 illustrate the gust front display generation.

For the TDWR stand-alone system, a "gust front curve" 1012 (FIG. 11) is generated when a gust front is detected. This curve is used for both graphical display and for generating TDWR runway oriented gain alerts. TDWR generates a (stand-alone) location as follows: When a given TDWR gust front curve 1012 intersects a given runway alert box 1001, the location for the alert is the "first-place" of intersection 1010 (in the direction of runway use—arrival or departure). Note, this is for the TDWR stand-alone configuration. When in an integration-mode, things are different for TDWR. First, to use a given TDWR gust front curve, it must pass a "length-test". That is, there must be a certain "intersection-length" inside the "TDWR alert region" (not just any intersection with the whole alert box—as in the stand-alone). If this length criteria for TDWR gust front curve is met, the location for this intersection is the intersection points of the gust front curve and the TDWR alert region. Note, these intersection points, and hence the alert location may be different in the integration-mode as in the stand-alone mode—for the same gust front curve. The overall location for the integrated alert, becomes the "first encounter" (in the direction of runway use) location from both systems. The magnitude for the alert is the maximum from either system.

Gust-Front Detection, Tracking and Display from LLWAS

Besides the generation of windshear-with-gain alerts, LLWAS anemometer wind vectors are utilized to detect, track, and graphically display gust-fronts. This is accomplished by gust front tracking apparatus 119. The salient differences between these two items (gain-alerts and gust front detection, etc.) are:

(1) Alert information is (a) not necessarily tied to gust fronts, per se i.e. a "gain-alert" is a generic wind shear hazard—not always generated by the meteorological condition defined by the term "gust-front".

(b) used for "real-time" operations: either for a "heads-up" or avoidance procedure for the pilots.

(c) displayed on both the geographic situation display and ribbon display terminals. However, as indicated in (b) above, its use therein is for "real-time" operations.

(2) In contrast, the gust-front information, (detection, tracking and graphical display), is (a) Not necessarily tied to a runway specific wind shear hazard. For example, there can be a strong cross wind which is of interest to pilots and air traffic control personnel, yet not an along-flight-path wind shear-with-gain situation. In the present stand-alone LLWAS system, this situation is not reported to the users—since it is not a runway-oriented situation. However, it is of major concern to the users:

(i) the pilots may encounter the above situation and (though not a headwind shear) might conclude that the present LLWAS system missed the detection—potentially degrading the overall credibility of the system.

(ii) There are regulations that indicate unsafe cross wind runway use. That is, above a certain cross wind value, a runway cannot be used for airport operations. However, with the present LLWAS system, it is very difficult for the air-traffic control personnel to detect such a situation. This is because they have a limited amount of wind-vector information. There is no graphical display to visually interpret the situation, and there is only a very limited number of anemometer winds that are displayed on the ribbon display terminals.

(b) Associated with the above real-time detection items, there are airport operation planning functions that are of significant importance. That is, the configuration of the runway operations. At a given time, there are specific flight-paths (approaches and departures) that are used for the airport. When a significant wind shift or cross-wind situation occurs, the runway-use configuration must be changed. This generally has a large impact on airport operational efficiency: requiring re-routing of inbound air traffic and redistributing the ground traffic for the new runway configuration.

Again, this planning capability is not available from the present LLWAS system. It is, however available from the TDWR system. However, this product from TDWR tends to be somewhat limited due to previously mentioned problems with the TDWR system: radial-only wind information, reliance on atmospheric reflectors, and low temporal resolution.

Gust Front Algorithm Outline—Gust Front Detection

Many of the basis computational techniques used herein are simple modifications to procedures that were developed for generating the LLWAS microburst shapes (FIG. 2). This allows for the utilization of well-tested concepts—and software—with minor modifications.

Recalling the steps described for the microburst shapes:
(1) inputting LLWAS triangle and edge divergence values
(2) mapping to grid
(3) clumping above-threshold grid points
(4) building shapes from clumps
(5) modifying shapes via breaking-up and least squares size reduction to isolate the most hazardous divergence region.

We note that these techniques are based on the physical nature of microbursts. That is, they tend to be (though not always) isolated, convex spatial features with associated divergent and somewhat symmetrical surface outflow wind fields. In contrast, gust fronts tend to be large scale, extended, semi-linear spatial entities with a convergent surface wind field signature.

With these concepts in mind, by using steps (1-4), described above, with LLWAS triangle and edge convergence values and the computed low-level density grid point clumps—and of course different thresholds—"gust-front shapes" are generated. As for microbursts, these shapes indicate the locus of space wherein the feature of interest lies. However, the shapes are designed to model a somewhat convex feature, and as indicated above, a gust front tends to be a extended, semi-linear phenomena. But we note that in building a shape, the axis line segment has been computed to be the best weighted least-squares line through a given clump's grid points. And so, this line segment gives a good local approximation to a gust front. Therefore, by "tying-together" these local approximations—from a set of shapes built from convergence-clumps along the length of the gust front, we get a good global representation of the feature.

Refinements of this above-mentioned technique are required in certain situations:

(1) If a clump of convergence grid points is somewhat symmetrical, the axis line segment for the associated shape (local approximation) may not correspond to the global "line-structure" of the gust front. This problem tends to be a function of lack of spatial resolution of the actual wind field because of the general sparsity of the LLWAS anemometers. This situation is remedied by combining other available information:

(1) Using the high temporal resolution in the LLWAS data, i.e. employing a time-local tracking to determine the most appropriate orientation for the line-segment.

(2) Using the global-structure of the computed set of line-segments, to determine if one of them is "out-of-step".

(3) Computing the "flux" across the outlier segment. That is, the axis line-segment is computed as the best line fit through the clump's grid points. However in this type of locally-symmetric clumping, this line may not reflect the actual line-convergence that we are trying to model. Therefore the line is rotated such that it maximizes the convergence across it, i.e. the local wind-field flux.

(2) Since we are looking for an extended feature, and are building it up from local-detections (local convergence clumps), there needs to be a overall length criteria. That is, the global feature that is built-up from the individual shape axis-line segments must be at least a certain nominal threshold length. This prevents false-detections of isolated convergence features that are not part of a true gust front.

(3) Continuing a feature through a "hole". A procedure is used to allow for the extension of a feature through a gap in the detected convergence data. This is accomplished by using the global information to determine when an inadvertent gap exists—and simply generating a "phantom" line segment that connects the existing detected portions.

Finally, note (referring back to the microburst shape generating steps (1-5), above) that for this purpose—detecting a gust-front—some of the computations are eliminated. That is, since all that is needed are the axis line segments for a shape, the following steps are not needed:
(a) radius computation(s) and associated shape area minimization procedure
(b) least-squares shape size reduction
(c) "high-level" grid point clumping
(d) shape-magnitude computations.

Gust Front Tracking

Figure 12:
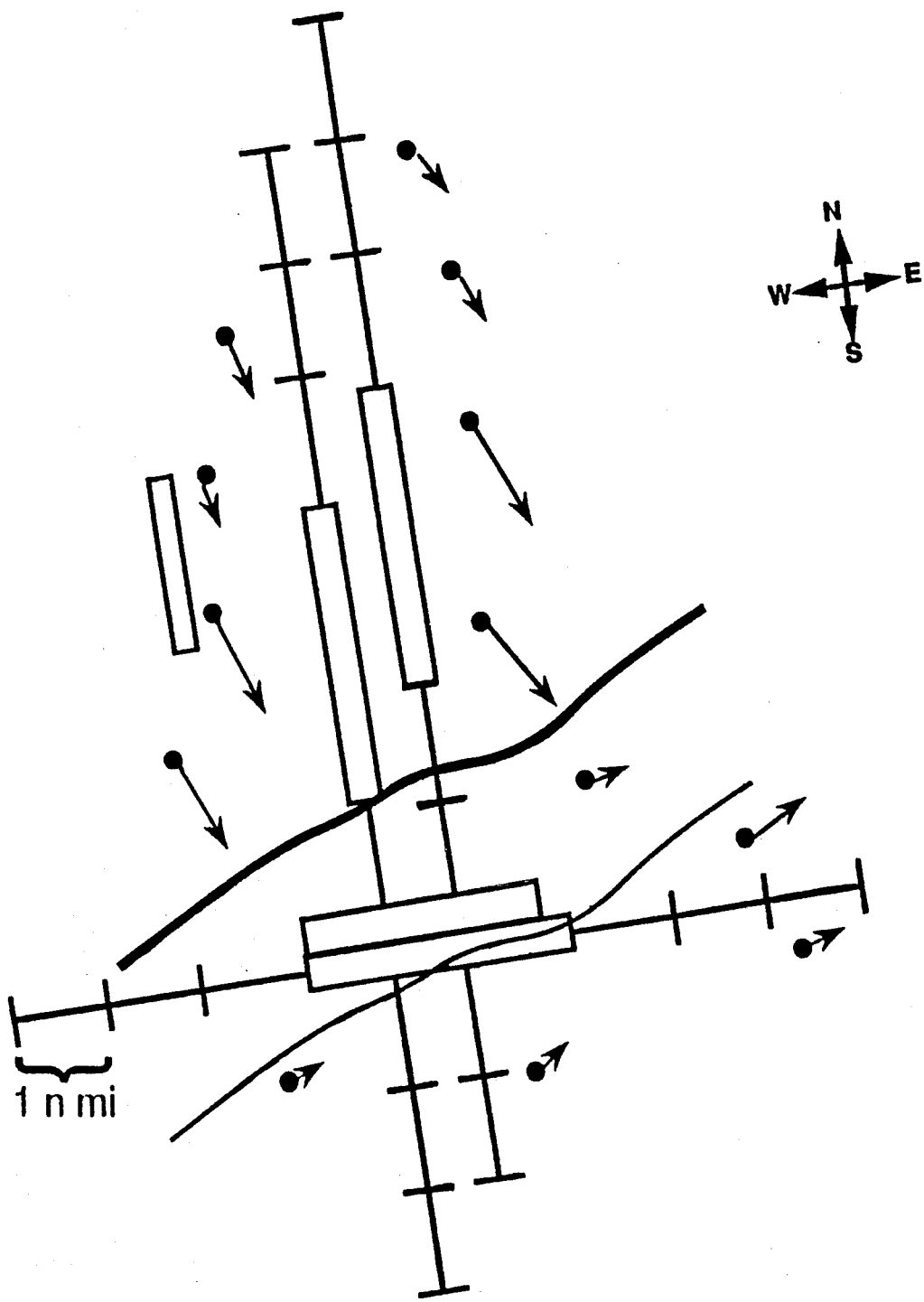

The abovementioned algorithm steps generate a "current-time" detection of a gust front which is displayed as illustrated in FIG. 12 on displays 116, 117 and via telemetry link 118 in the aircraft using the airport. As was previously indicated, a significant increase in overall operational air traffic efficiency can be obtained via planning for changes in runway-use configuration. This function is greatly enhanced by predicting gust front motion. That is, if a given runway will be impacted in the near-time, a runway re-configuration can be implemented in an organized fashion—as opposed to a reactive and hence inefficient fashion.

Because LLWAS anemometer data is updated fairly rapidly (on the order of every ten seconds), the tracking and hence predicted future location of a gust front can be obtained. This is accomplished by defining a propagation vector whose origin is the "current-location" of the gust front and whose magnitude is the velocity of the front. This propagation vector is then used to predict a future location.

The first task is then to determine the current-location point. This is done by fitting a least-squares line through the end points of the current line-segments computed in the previous section. The current-location, or origin of the propagation vector is taken as the barycenter of this line. Note that the least squares line is, (by definition), infinite in length. To compute a barycenter along it, we create a line-segment by projecting (onto it) the extremal points of the current detected line segments. The barycenter is then the midpoint (along the least square line fit) of these two (extremal) projections.

To compute the velocity of this line we use barycenter points from previous times. This is computed by using the relation, "velocity is distance divided by time". Or, equivalently "time is distance times velocity". We can write this as a matrix equation:

$$T = DV$$

where time is a (nx1) vector of times, D a (nx2) matrix of positions and V is the (unknown) (2×1) vector for the velocity. Where the number "n" is the amount of past values we are using, the positions are those of the past barycenters, and the times are the time intervals between the past values. Therefore this matrix equation is solved using a least squares technique giving an estimate for velocity (which we write as $\tilde{V}$) in matrix notation:

$$\tilde{V} = (D^T D)^{-1} D^T T$$

the superscript "$T$" indicating matrix transposition and the superscript "$-1$" indicating matrix inversion.

Finally, the above information is combined to predict a future location, by again employing the relation "distance is velocity multiplied by time". So that the predicted location for the current barycenter (call it $B_p$) in a time interval (call it $\Delta T$) is:

$$B_p = \tilde{V} \times \Delta T$$

or since we are using a (x,y) coordinate system, $$Bx = Vx \Delta T$$

$$By = Vy \Delta T$$

This gives a predicted location for the current barycenter, however, for a graphical display—where this is to be used—the current detected gust front line segments as a whole are projected forward in time, as illustrated in FIG. 12.

Display

Display 116, 117 is the mechanism to translate the microburst and gust front data and runway alerts into information in a form and format that is useable by pilots and air traffic personnel. The functions embodied in display 116, 117 are illustrated in the logic diagram of FIG. 7. In particular, the validated LLWAS microburst shapes and LLWAS runway oriented loss data 705 are combined in microburst integration apparatus 113, which represents one segment of runway loss alert generation 709. The other portion of runway loss alert generation 709 is a function that is included in Terminal Doppler Weather Radar system 502. This function utilizes the generated microburst shapes by mapping them on to runway locations to identify which runways are impacted by the microburst. Similarly, the gust front integration apparatus 115 represents a portion of the runway gain alert generation function 711 illustrated in FIG. 7. The remainder of the runway gain alert generation function 711 is a standard element located within Terminal Doppler Weather Radar system 502. The alarms generated by alert generation elements 709 and 711, are arbitrated by alarm arbitration process 710 which again is an element found in a standard TDWR system 502. The arbitration is required because, as can be seen from FIG. 6, a plurality of microbursts M1-M8 can be simultaneously active around a single airport location.

The magnitude of the microbursts as well as their location are provided both by the validated LLWAS microburst shape data 705 and the TDWR microburst shape data 706. The magnitudes and locations must be translated into the two types of displays noted above which are standard with the TDWR system 502. In particular, the geographic situation display found in the TDWR system 502 is a graphical presentation similar to that illustrated in FIG. 6 which is used by the air traffic control supervisor to obtain a broad perspective view of the weather activity in and around the airport location. This graphical display therefore requires that the microburst shapes be illustrated not only in location and size but also magnitude. The magnitude is typically represented by a numerical designation located within the confines of the microburst shape displayed on the geographical situation display. These numbers not illustrated in FIG. 6 for the purpose of clarity but, instead, microbursts of a magnitude greater than a predetermined threshold are highlighted by the use of cross hatching in FIG. 6. The magnitude of the microburst can be represented on the geographic situation display by the numerical designation as noted above as well as a color to delineate the intensity of the microburst with respect to the other microbursts also illustrated on the display.

As can be seen from FIG. 6, this display provides a significant amount of information by presenting the runway layout as well as the plurality of microbursts active around the particular airport location including indications of the magnitude of the microburst. However, such a display is unnecessarily complicated for the air traffic controllers who must guide the individual aircraft in the landing pattern around the airport. Therefore, each air traffic controller is provided with a ribbon display terminal to provide a textual set of information of greatest relevance to the air traffic controller. The standard alert output consists of an alphanumeric display that indicates that magnitude of the alerts (loss or gain) and the runway(s) presently affected. This information is relayed to the pilot of the plane arriving or departing and is sufficient for to determine whether or not it is safe for airplanes to arrive or depart on the runways within the bounds of the airport. Therefore, the alarm arbitration process 710 that is found within TDWR system 502 condenses all the information that is displayed in graphical form on the geographic situation display into a simple textual output for the ribbon display terminal for the air traffic controllers.

Summary

The improved Wind Shear Alert System disclosed above makes use of two wind shear detection systems to provide wind shear alerts for an airport location of improved precision and timeliness over that presently available. In the preferred embodiment disclosed above, the existing LLWAS system 101 and TDWR system 502 are used with minimal modifications thereto in a complimentary and cooperative fashion. The strength of both of the systems are highlighted while the weaknesses therein are offset by the strengths of the other system. The integration of other wind shear alert systems or weather detection systems with either or both of the TDWR or LLWAS systems can also be accomplished using methodology disclosed above. By obtaining data having a high credibility from one system and using it to confirm or deny wind shear detections of questionable credibility in the other system increases the number and accuracy of microbursts and wind shear events that are detected by this system. The generation of microburst shapes using the LLWAS data enables this system to integrate with the TDWR system without requiring modifications thereto. The alarm generation, arbitration and display can be significantly different than that disclosed herein but, the existing TDWR system 502 displays are used in the preferred embodiment for simplicity.

While a specific embodiment of this invention has been disclosed, it is expected that those skilled in the art can and will design alternate embodiments of this invention that fall within the scope of the appended claims.

I claim:

1. Apparatus for identifying the presence and locus of wind shear in a predefined area comprising:
    in-situ wind sensing system for producing data indicative of wind shear activity in close proximity to ground level within a predefined area as measured by a plurality of sensors, each of which is located at one of a plurality of predefined points in said predefined area;
    weather radar wind sensing system for producing data indicative of wind activity up to a predetermined altitude above said predefined area; and
    means for combining said data from said in-situ wind sensing system with said data from said weather radar wind sensing system, including:
    means, responsive to said wind data from said in-situ wind sensing system and said data from said weather radar wind sensing system, for determining the validity of data from either said in-situ wind sensing system and said weather radar wind sensing system.

2. The apparatus of claim 1 further comprising:
    means for displaying in human readable form said wind 3. The apparatus of claim 1 wherein said combining means further comprises:
    means, responsive to said determining means for arbitrating between said data from said in-situ wind sensing system and said weather radar wind sensing systems to indicate the presence and locus of wind shear in said predefined area.

4. The apparatus of claim 1 wherein said combining means comprises:
    means for collecting wind measurements, indicative of wind magnitude and direction at said plurality of predefined points in said predefined area, from said in-situ wind sensing system; and
    means for producing wind shear shape data indicative of the bounds of wind shear events within said predefined area based upon said collected wind measurements.

5. The apparatus of claim 4 wherein said combining means further comprises:
    means for identifying, using said wind shear shape data, a presence and locus of wind shear in said predefined area.

6. The apparatus of claim 5 wherein said combining means further comprises:
    means for storing runway template data indicative of the locus of at least one airport runway in said predefined area; and
    means for mapping said identified wind shear locus to said runway template data to denote said identified wind shear locus with respect to said at least one runway.

7. A method for identifying the presence and locus of wind shear in a predefined area comprising the steps of:
    producing, using an in-situ wind sensing system, data indicative of wind shear activity in close proximity to ground level within a predefined area as measured by a plurality of sensors, each of which is located at one of a plurality of predefined points in said predefined area;
    producing, using a weather radar wind sensing system, data indicative of wind activity up to a predetermined altitude above said predefined area; and
    combining said data from said in-situ wind sensing system with said data from said weather radar wind sensing system, including:
    determining, in response to said wind data from said in-situ wind sensing system and said data from said weather radar wind sensing system, the validity of data from either said in-situ wind sensing system and said weather radar wind sensing system.

8. The method of claim 7 further comprising the step of:
    displaying in human readable form said wind shear data.

9. The method of claim 7 wherein said step of combining further comprises:
    modifying, in response to said step of determining said data from either said in-situ wind sensing system or said weather radar wind sensing systems.

10. The method of claim 7 wherein said step of combining comprises:
    collecting wind measurements, indicative of wind magnitude and direction at said plurality of predefined points in said predefined area, from said in-situ wind sensing system; and
    producing wind shear shape data indicative of the bounds of wind shear events within said predefined area based upon said collected wind measurements.

11. The method of claim 10 wherein said step of combining further comprises:
    identifying, using said wind shear shape data, a presence and locus of wind shear in said predefined area.

12. The method of claim 11 wherein said step of combining further comprises:
    storing runway template data indicative of the locus of at least one airport runway in said predefined area; and
    mapping said identified wind shear locus to said runway template data to denote said identified wind shear locus with respect to said at least one runway.

13. The method of claim 7 wherein said step of combining comprises:
    arbitrating between said data form said in-situ wind sensing system and said weather radar wind sensing system to indicate the presence and locus of wind shear in said predefined area.

* * * * *